July 2, 1968  R. S. SCALAN  3,391,211
COMPOUND MODIFICATION

Filed March 18, 1965  2 Sheets-Sheet 1

INVENTOR
R. S. SCALAN
BY Young and Quigg
ATTORNEYS

United States Patent Office 3,391,211
Patented July 2, 1968

3,391,211
COMPOUND MODIFICATION
Richard S. Scalan, Bartlesville, Okla., assignor to Phillips Petroleum Company, a corporation of Delaware
Filed Mar. 18, 1965, Ser. No. 440,704
12 Claims. (Cl. 260—676)

ABSTRACT OF THE DISCLOSURE

An organic material such as a carboxylic acid is modified by the removal of at least one functional group therefrom by comminuting the organic material with a finely-divided comminuting aid such as sand grains.

---

This invention relates to a method for modifying compounds which contain at least one functional group in a manner which removes at least part of the functional groups. In one aspect, this invention relates to a method for decarboxylating carboxylic acids.

Heretofore the removal of certain functional groups from hydrocarbon-containing compounds has been effected chemically and biologically by the use of, inter alia, quite elevated temperatures and drastic reducing conditions. Generally, elevated temperatures heretofore employed were in the neighborhood of or substantially above the cracking temperature of the material treated.

It has now been found that a compound having an acyclic, i.e., straight and/or branched chain, nucleus to which is attached at least one functional group selected from the group consisting of carboxy radicals, dithiocarboxy radicals and monothiocarboxy radicals can be modified at substantially ambient temperatures and pressures to remove the functional group or groups by comminuting the compound while in the solid phase in the presence of a finely divided abrasive.

Accordingly, an object of this invention is to provide for modifying organic compounds to remove functional groups. It is another object of this invention to provide a method for the decarboxylation of carboxylic acids.

Other aspects, objects and the several advantages of the invention will be readily apparent to those skilled in the art from the description and the appended claims.

Figure 1:
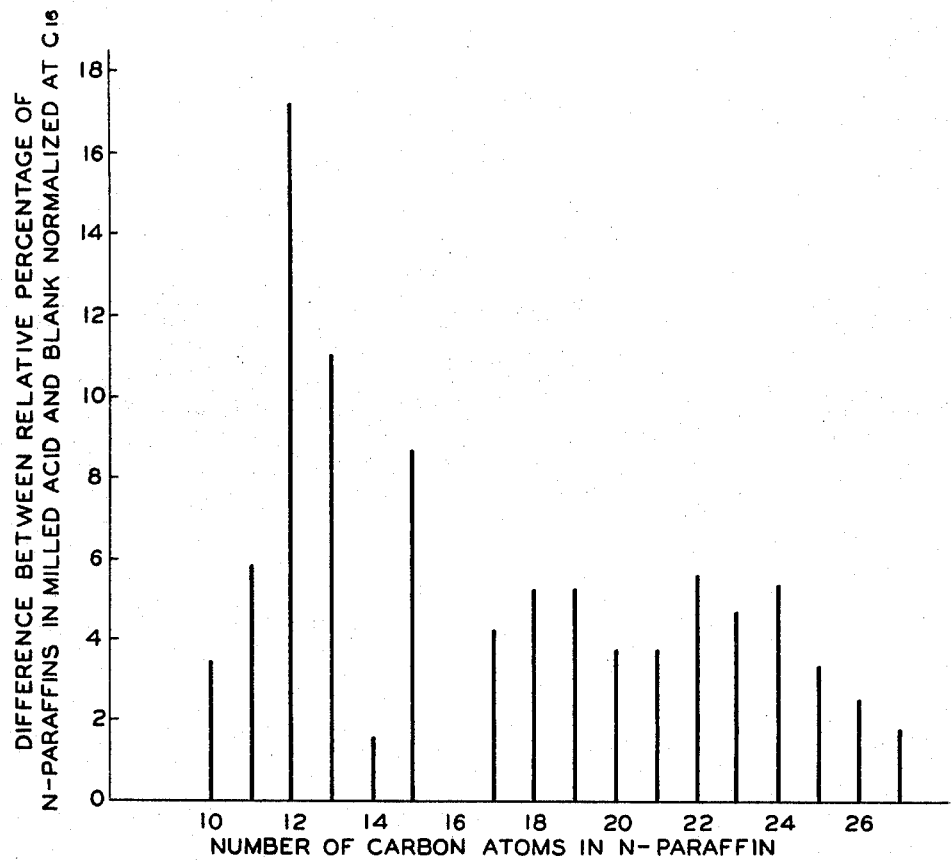
FIGURE 1 shows in graphic form the carbon atom composition of a product of this invention.

Referring to FIGURE 1, there is shown the results of the treatment of a fatty acid having chains containing 13 carbon atoms. It can be seen that there was produced a substantial amount of n-paraffins containing 12 carbon atoms thereby indicating that the carboxy radicals were removed and a hydrocarbon produced. It should also be noted that a lesser but still substantial amount of n-paraffins containing 24 carbon atoms was produced thereby indicating linking of two radicals of the above-mentioned n-paraffins containing 12 carbon atoms.

Figure 2:
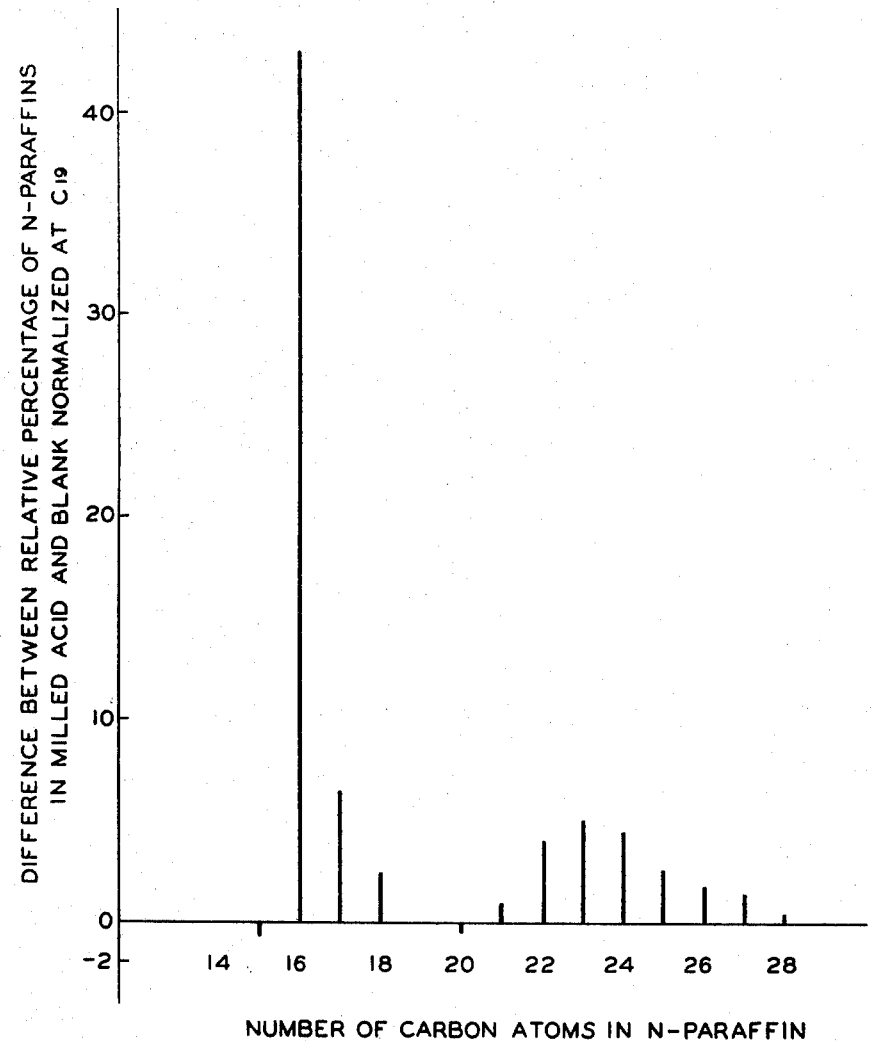
FIGURE 2 shows in graphic form the carbon atom composition of another product of this invention.

Referring to FIGURE 2, treatment of the fatty acid containing 17 carbon atoms per molecule by the method of this invention produced a very substantial amount of n-paraffins having 16 carbon atoms per molecule. This also indicates the removal of the carboxy radicals thereby producing a homogeneous n-paraffin.

According to this invention an organic compound having an acyclic nucleus, preferably a hydrocarbon nucleus, and having attached to said nucleus, preferably in the terminal position, at least one functional group as above defined, preferably one or two functional groups, is comminuted while in the solid phase at substantially ambient temperature, preferably from about 15 to about 100° C., and in the presence of a finely divided abrasive material.

The nucleus should contain at least 10 carbon atoms and preferably contains from 12 to 30 carbon atoms, inclusive. The fatty acid can be charged as a single piece in the comminution operation but is preferably employed in particulate form, in the form commonly available on the market.

The particles preferably have an average size of from about 100 to 300 mesh.

The compound treated by this invention can contain mixtures of 2 or more of the above-defined nuclei. The compound can be substantially pure, i.e., at least 98 percent being a nucleus or nuclei to be treated, or can be impure, i.e., containing less than 98 percent of the nucleus or nuclei to be treated.

Although not generally required, it is preferred that the comminution be carried out in the presence of an inert atmosphere such as nitrogen, argon, helium and the like. Although not generally necessary, there can also be employed, if desired, a reducing agent which will insure a reducing medium. Such agents include alkali metal salts such as sodium sulfide, sodium bisulfite, sodium sulfite and other soluble sulfides, sulfites and iodides. Other known reducing agents such as hydrogen gas can also be employed. Generally, a reducing agent is employed in amounts of from about 0.2 to about 0.5 weight percent based on total charge.

The finely divided abrasive or comminuting aid of this invention can be any particulate, hard material which will aid in the breaking up of the compound particles to be modified and inert to said compound. Such materials include silica (sand), alumina, thoria, carbides such as metal carbides, silicides, borides and the like. Although the particle size of the comminuting aid can vary widely it will generally be no smaller than 60 mesh and will preferably be from about 50 to about 60 mesh. The pressure employed during comminuation will generally be the ambient pressure although higher or lower pressures can be employed if desired.

The comminution process itself can be carried out in any manner which applies a high shear stress to the compound to be modified. Suitable apparatus for this process is well known and includes ball mills employing both steel and ceramic balls, centrifugal ball mills, rod mills, high shear milling machines, mixers such as Banbury mixers and the like. The time of comminution will vary widely depending upon the hardness of the comminuting aid and the efficiency of the comminuting apparatus but will generally be from about 1 to about 30 hours.

Example I

About 300 grams of cleaned Ottawa sand, 1 gram of 99 percent pure fatty acid containing 13 carbon atoms per molecule (tridecanoic acid), 150 grams of water, and about 0.2 grams of sodium sulfide was milled in a ball mill for from 12 to 18 hours at 200 revolutions per minute. The milling was carried out in the presence of an inert atmosphere of nitrogen at 26° C. and 0 p.s.i.g. The sand grains were originally from 200 to 300 microns in size and at the end of the milling process were reduced to from 5 to 15 microns in size.

Following the milling, the mass was washed out of the milling vessel with 500 ml. of a 2:1 mixture of methanol and chloroform. The mixture was centrifuged and the supernatant fluid was filtered. The residue was rewashed with an additional 500 ml. of the solvent, centrifuged and filtered. To the combined filtrates was added 200 ml. each of distilled water and chloroform. The mixture was allowed to separate into two phases and the lower, chloroform, phase was separated and evaporated to dryness on a rotary vacuum evaporator.

The resulting residue was taken up in n-hexane and placed on a silica-gel column prewet with n-hexane. Saturated hydrocarbons were eluted with n-hexane. The acids were eluted from the column with acetone and methanol.

Analysis for n-paraffins and fatty acids (converted to their methyl esters) was performed by standard gas-liquid-partition chromatographic procedures. The analytical results were obtained as the relative percentages of the individual n-paraffins or fatty acids present and the difference in relative percentages of n-paraffins in the milled $C_{13}$ acid and the unmilled acid control blank (the relative percentages of the control blank normalized at carbon number 16 are plotted in FIGURE 1. Thus, from the 13 carbon atom fatty acid there was produced a 12 carbon atom n-paraffin.

Example II

A procedure similar to that of Example I was followed except that a 99 percent pure 17 carbon atom fatty acid (heptadecanoic acid) was employed in lieu of the 13 carbon atom fatty acid of Example I. The difference in relative percentages of n-paraffins in the milled $C_{17}$ acid and the unmilled acid control blank (the relative percentages of the control blank normalized at carbon number 19) are plotted in FIGURE 2. Thus, in this example, 17 carbon atom fatty acids were converted at 16 carbon atom n-paraffins.

A procedure similar to that of Example I was followed except that phenylacetic acid was substituted for the fatty acid of Example I. Decarboxylation of the acid was not effected and results similar to those of Examples I and II were not achieved.

A procedure similar to that of Example I was followed except that octadecanol was substituted for the fatty acid of Example I. The hydroxy functional group was not removed as the carboxy radical was in Examples I and II and results similar to Examples I and II were not achieved.

Reasonable variations and modifications are possible within the scope of this disclosure without departing from the spirit and scope of the invention.

I claim:

1. A method for removing at least one functional group from a normally solid compound capable of existing in the solid phase at ambient temperatures and pressures and having an acyclic hydrocarbon nucleus containing at least 10 carbon atoms and having attached to said nucleus at least one functional group selected from the group consisting of carboxy radicals, dithiocarboxy radicals and monothiocarboxy radicals comprising comminuting said compound in the solid phase with a finely divided abrasive and at ambient temperatures and pressures.

2. The method according to claim 1 wherein said acyclic nucleus has no more than two functional groups attached thereto.

3. A method for removing at least one functional group from a normally solid organic compound capable of existing in the solid phase at a temperature of from about 15 to about 100° C. and having an acyclic hydrocarbon nucleus containing from 12 to 30 carbon atoms and having attached to said nucleus no more than two functional groups selected from the group consisting of carboxy radicals, dithiocarboxy radicals and monothiocarboxy radicals, comprising comminuting at a temperature from about 15 to about 100° C. said compound while in the solid phase and in the presence of a hard comminuting aid which is inert to said compound and of a mesh size no smaller than about 60.

4. The method according to claim 3 wherein one functional group is attached to said nucleus and the comminuting is carried out in the presence of an inert atmosphere.

5. The method according to claim 3 wherein two functional groups are attached to said nucleus and the comminuting is carried out in the presence of an inert atmosphere.

6. A method for decarboxylating a carboxylic acid having comminuting at ambient temperatures, said acid while in the solid phase and in the presence of a finely divided, inert comminuting aid.

7. A method for decarboxylating a carboxylic acid having from 12 to 30 carbon atoms per molecule comprising comminuting said acid while in the solid phase at a temperature from about 15 to about 100° C. and in the presence of an inert particulate abrasive of from 50 to 60 mesh.

8. The method according to claim 7 wherein said acid is a monocarboxylic acid, and the comminution is carried out in the presence of an inert atmosphere and a reducing agent.

9. The method according to claim 7 wherein said acid is a dicarboxylic acid and the comminution is carried out in the presence of an inert atmosphere and a reducing agent.

10. A method for producing normal paraffins from fatty acids comprising comminuting said fatty acids while in the solid phase at a temperature of from about 15 to about 100° C. and in the presence of a hard, inert abrasive of from 50 to 60 mesh in size.

11. A method for making normal paraffins containing 12 carbon atoms per molecule from fatty acids containing 13 carbon atoms per molecule comprising comminuting said fatty acids while in the solid phase at about 26° C. and about 0 p.s.i.g., in the presence of sand grains having a size of from 200 to 300 microns and in the presence of an inert atmosphere and a reducing agent.

12. A method for making normal paraffins containing 16 carbon atoms per molecule from fatty acids containing 17 carbon atoms per molecule comprising comminuting said fatty acids while in the solid phase at about 26° C., and about 0 p.s.i.g., in the presence of sand grains having a size of from 200 to 300 microns and in the presence of an inert atmosphere and a reducing agent.

References Cited

Brewster et al., "Organic Chemistry," Prentice-Hall, New Jersey, 1961 (p. 318).

DELBERT E. GANTZ, *Primary Examiner.*

J. D. MYERS, *Assistant Examiner.*

UNITED STATES PATENT OFFICE
CERTIFICATE OF CORRECTION

Patent No. 3,391,211                                                      July 2, 1968

Richard S. Scalan

It is certified that error appears in the above identified patent and that said Letters Patent are hereby corrected as shown below:

Column 4, line 16, before "comminuting" insert -- a chain length of at least 10 carbon atoms comprising --.

Signed and sealed this 10th day of March 1970.

(SEAL)
Attest:

Edward M. Fletcher, Jr.                              WILLIAM E. SCHUYLER, JR.
Attesting Officer                                                Commissioner of Patents